(12) United States Patent
Kawada et al.

(10) Patent No.: US 10,224,519 B2
(45) Date of Patent: Mar. 5, 2019

(54) SECONDARY BATTERY AND METHOD OF MANUFACTURING THE SAME

(75) Inventors: Yoshitaka Kawada, Tokyo (JP); Tetsuo Sakai, Tokyo (JP); Natsuki Toyota, Takasaki (JP); Naotada Okada, Yokohama (JP); Susumu Yahagi, Yokohama (JP)

(73) Assignee: Toshiba Corporation, Tokyo (JP)

( * ) Notice: Subject to any disclaimer, the term of this patent is extended or adjusted under 35 U.S.C. 154(b) by 1355 days.

(21) Appl. No.: 13/356,392

(22) Filed: Jan. 23, 2012

(65) Prior Publication Data

US 2012/0189904 A1    Jul. 26, 2012

(30) Foreign Application Priority Data

Jan. 25, 2011 (JP) .................. P2011-12670
Nov. 9, 2011 (JP) .................. P2011-245193

(51) Int. Cl.
*H01M 2/04* (2006.01)
*H01M 2/36* (2006.01)
H01M 10/0525 (2010.01)
H01M 2/02 (2006.01)

(52) U.S. Cl.
CPC ........... *H01M 2/0426* (2013.01); *H01M 2/36* (2013.01); *H01M 2/365* (2013.01); *H01M 2/0217* (2013.01); H01M 10/0525 (2013.01); Y10T 29/49108 (2015.01)

(58) Field of Classification Search
CPC ...... H01M 2/0426; H01M 2/365; H01M 2/36; H01M 2/0217; H01M 10/0525; Y10T 29/49108
See application file for complete search history.

(56) References Cited

U.S. PATENT DOCUMENTS

| 6,045,944 A | 4/2000 | Okada et al. |
| 6,163,011 A | 12/2000 | Urushizaki et al. |
| 2005/0139640 A1* | 6/2005 | Kay .................. 228/112.1 |
| 2006/0024573 A1* | 2/2006 | Yim et al. .............. 429/174 |

FOREIGN PATENT DOCUMENTS

| CN | 1577918 A | 2/2005 |
| JP | 9007560 | 1/1997 |
| JP | 2002239762 | 8/2002 |
| JP | 2003088971 | 3/2003 |
| JP | 2005044691 A | 2/2005 |
| JP | 2007294308 | 11/2007 |
| JP | 2007329076 A | 12/2007 |
| KR | 20060025940 | 3/2006 |

OTHER PUBLICATIONS

European Search Report dated May 21, 2012.

* cited by examiner

*Primary Examiner* — Ula C Ruddock
(74) *Attorney, Agent, or Firm* — Baker Botts L.L.P.

(57) ABSTRACT

A secondary battery according to an embodiment includes a container having a pouring hole through which an electrolyte is poured, and housing the electrolyte, poured through the pouring hole, together with an electrode body; and a sealing lid which is fixed to the container and is closing the pouring hole. The sealing lid has a welding mark existing in a ring shape with a depth through the sealing lid to a lid body of the container, and an inner circumferential side molten mark existing in a ring shape overlapping with the welding mark, on the inner circumferential side of the welding mark in the sealing lid, with a depth corresponding to the thickness of the sealing lid.

5 Claims, 6 Drawing Sheets

US 10,224,519 B2

SECONDARY BATTERY AND METHOD OF MANUFACTURING THE SAME

CROSS-REFERENCE TO THE RELATED APPLICATION

This application is based on and claims the benefit of priority from Japanese Patent Applications No. 2011-12670, filed on Jan. 25, 2011 and No. 2011-245193, filed on Nov. 9, 2011; the entire contents of which are incorporated herein by reference.

FIELD

Embodiments herein relate to a secondary battery and a method of manufacturing a secondary battery.

BACKGROUND

In recent years, secondary battery represented by a lithium ion battery has increasingly wide range of applications, mainly for in-vehicle use, and the production volume is constantly increasing. In the process of manufacturing a secondary battery, a method is often employed, in which the components of the battery are sealed in a metal case. In addition, in order to improve the space efficiency of the secondary battery, a rectangular cell case is often employed rather than a conventional circular case. In both cases where the circular cell case is employed and where the rectangular cell case is employed, laser welding, by which a structural body can be manufactured efficiently, is more often used for manufacturing lithium ion batteries.

In the manufacturing process of a lithium ion battery, laser welding is often used in the following three processes:

1. Cap seam welding for bonding an aluminum can body and a cap member together.
2. Seal welding for closing a pouring hole for pouring an electrolyte.
3. Component welding for electrically connecting a plurality of cells in parallel or in series.

However, in the seal welding of the second process among the above-mentioned processes, a laser beam is caused to penetrate from a surface of an object to be joined to an opposite surface thereof to melt an opposed object, thereby integrating the two objects. Consequently, micro cracks occur in the course of solidifying process of the objects.

DETAILED DESCRIPTION

A secondary battery according to an embodiment includes a container having a pouring hole through which an electrolyte is poured, and housing the electrolyte, poured through the pouring hole, together with an electrode body; and a sealing lid fixed to the container and closing the pouring hole. The sealing lid has a welding mark existing in a ring shape with a depth through the sealing lid to the container; and an inner circumferential side molten mark existing in a ring shape overlapping with the welding mark, on the inner circumferential side of the welding mark in the sealing lid, with a depth corresponding to the thickness of the sealing lid.

In addition, according to another embodiment, a method of manufacturing a secondary battery includes placing a sealing lid on a container in which an electrolyte has been poured, in such a manner as to close a pouring hole of the container; and irradiating the placed sealing lid with a laser beam in a ring shape in such a manner as to form a welding mark in the sealing lid, with a depth through the sealing lid to the container, thereby welding the sealing lid to the container, and irradiating the welded sealing lid with a laser beam in a ring shape in such a manner as to form an inner circumferential side molten mark in a ring shape overlapping with the welding mark, on an inner circumferential side of the welding mark in the sealing lid, with a depth corresponding to a thickness of the sealing lid.

Various Embodiments will be described hereinafter with reference to the accompanying drawings.

An embodiment is described with reference to the drawings.

Figure 1:
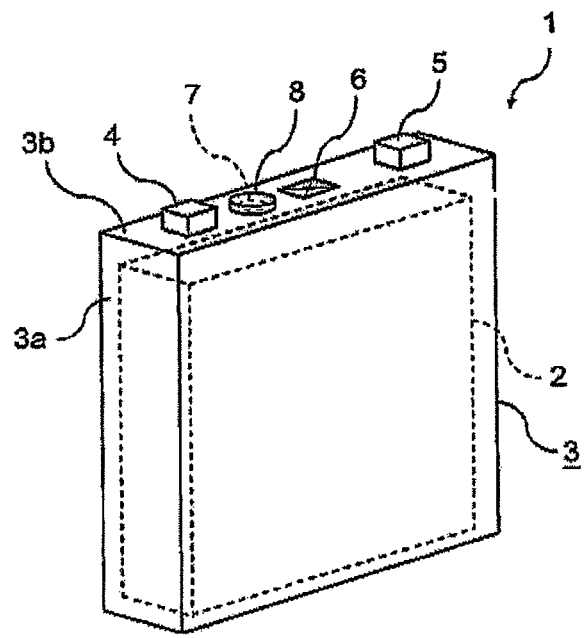
FIG. 1 is an external perspective view showing a schematic configuration of a secondary battery according to an embodiment.

As shown in FIG. 1, a secondary battery 1 according to the present embodiment includes an electrode body 2, a container 3 housing the electrode body 2 together with an electrolyte, and a pair of a positive electrode terminal 4 and a negative electrode terminal 5. The secondary battery is, for example, a non-aqueous electrolyte secondary battery such as a lithium ion battery.

The electrode body 2 is formed by winding positive and negative electrode sheets as power generation elements in a spiral shape with a separator being interposed between the electrode sheets. The electrode body 2 is housed in the container 3 together with the electrolyte.

The container 3 is an outer container in a flat rectangular parallelepiped shape, and is formed of, for example, a metal such as aluminum or an aluminum alloy. The container 3 has a one-end-open container body 3a having an opening at the upper end (in FIG. 1), and a lid body 3b having a rectangular plate shape for closing the opening of the container body 3a, and is liquid-tightly formed with the lid body 3b being welded to the container body 3a.

The positive electrode terminal 4 is provided at one end of the lid body 3b in the longitudinal direction, and the negative electrode terminal 5 is provided at the other end. The positive electrode terminal 4 and the negative electrode terminal 5 are respectively connected to the positive electrode and the negative electrode of the electrode body 2, and project from the upper surface of the lid body 3b. In addition, either one of the terminals, for example, the positive electrode terminal 4 is electrically connected to the lid body 3b to have the same potential as that of the container 3. The negative electrode terminal 5 extends through the lid body 3b, and a seal member made of an insulating material such as a synthetic resin or glass, for example, a gasket (not shown) is provided between the negative electrode terminal 5 and the lid body 3b. The seal member hermetically seals between the negative electrode terminal 5 and the container 3, while electrically insulating the negative electrode terminal 5 from the container 3.

A safety valve 6 having, for example, a rectangular shape is provided in the center portion of the lid body 3b. The safety valve 6 is formed by thinning a portion of the lid body 3b to approximately half the thickness of the other portion of the lid body 3b, and a stamp is formed in the middle of the upper surface of the thinned portion. In the case where the internal pressure of the container 3 exceeds a predetermined value because of generation of gas inside the container 3 due to a failure or the like of the secondary battery 1, the safety valve 6 is opened to release the gas inside the container 3 and to thus reduce the internal pressure of the container 3, thereby preventing a failure such as an explosion of the secondary battery 1.

In addition, a pouring hole 7 through which the electrolyte is poured into the container 3 is formed in the lid body 3b. The pouring hole 7 is a through-hole, and is formed, for example, in a circular shape. The electrolyte is poured into the container 3 through the pouring hole 7.

In addition, the lid body 3b is provided with a sealing lid 8 for closing the pouring hole 7. The sealing lid 8 is formed of, for example, a metal such as aluminum or an aluminum alloy, and is fixed on the lid body 3b in such a manner as to close the pouring hole 7. The sealing lid 8 is formed, for example, in a circular shape with its radius being greater than the radius of the pouring hole 7 so that the sealing lid 8 may be welded to the lid body 3b.

Here, the sealing lid 8 is welded to the lid body 3b by irradiating the upper surface of the sealing lid 8 with a laser beam in a ring shape. In this event, four spots on the outer edge of the sealing lid 8 are first irradiated with a laser beam having an output capable of melting a metal (temporary welding). Subsequently, the surface of the sealing lid 8 is irradiated once in a ring shape (main welding), and further irradiated twice in a ring shape.

Figure 2:
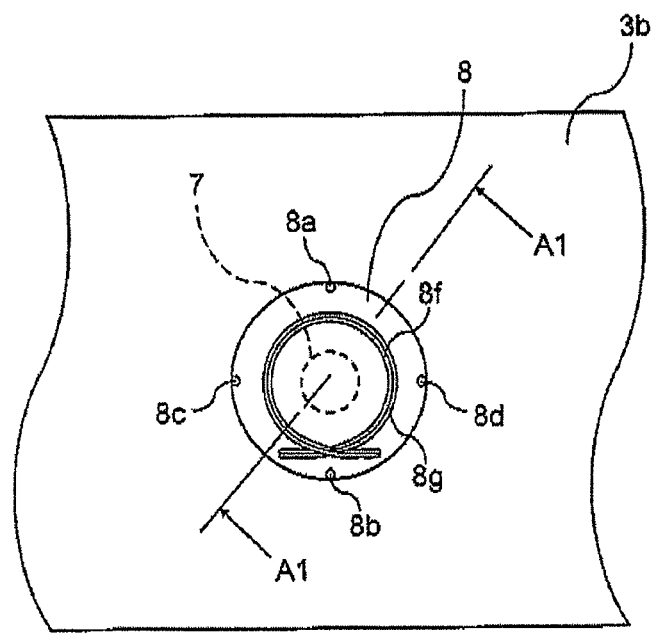
FIG. 2 is an enlarged plan view showing a periphery of a sealing lid of a container included in the secondary battery shown in FIG. 1.
Figure 3:
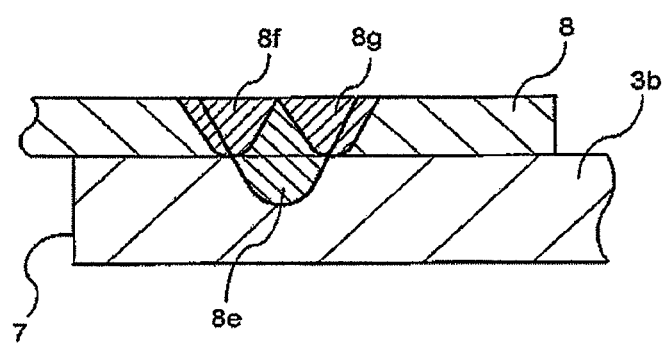
FIG. 3 is a cross-sectional view taken along a line A1-A1 in FIG. 2.

Therefore, as shown in FIGS. 2 and 3, the sealing lid 8 has four circular welding marks 8a, 8b, 8c, 8d due to the temporary welding, one welding mark 8e in a ring shape (see FIG. 3) due to the main welding, and a first molten mark 8f and a second molten mark 8g in ring shapes due to the laser irradiation after the main welding.

Each of the circular welding marks 8a to 8d is a mark formed by temporarily welding the sealing lid 8 to the lid body 3b with the laser irradiation before the main welding. The temporary welding is performed to prevent the sealing lid 8 from being caused to move by irradiating the surface of the sealing lid 8 with the laser beam in a ring shape at the time of the main welding.

The welding mark 8e is a mark formed by welding the sealing lid 8 to the lid body 3b with the laser irradiation of the main welding. The main welding is performed by irradiating the surface of the sealing lid 8 in a ring shape with a laser beam having an output capable of melting a metal. Consequently, the welding mark 8e exists in a ring shape with a depth through the sealing lid 8 to the container 3, and thus contributes to fixing of the sealing lid 8 to the lid body 3b.

The first molten mark 8f and the second molten mark 8g are formed to overlap with the welding mark 8e, closely adjacent to each other, respectively on the inner circumferential side and the outer circumferential side of the welding mark 8e by laser irradiation after the main welding. The laser irradiation is performed by irradiating the surface of the sealing lid 8 in a ring shape with a laser beam having an output capable of melting a metal (however, the output is lower than that of the above-described main welding so that the molten mark has the same depth as the thickness of the sealing lid 8).

Consequently, the first molten mark 8f exists in a ring shape overlapping with the welding mark 8e, on the inner circumferential side of the welding mark 8e in the sealing lid 8 with the same depth as the thickness of the sealing lid 8. Similarly, the second molten mark 8g exists in a ring shape overlapping with the welding mark 8e, on the outer circumferential side of the welding mark 8e in the sealing lid 8 with the same depth as the thickness of the sealing lid 8. Note that, the first molten mark 8f functions as an inner circumferential side molten mark, and the second molten mark 8g functions as an outer circumferential side molten mark.

Next, the manufacturing process (manufacturing method) of the above-stated secondary battery 1 is described.

Figure 4:
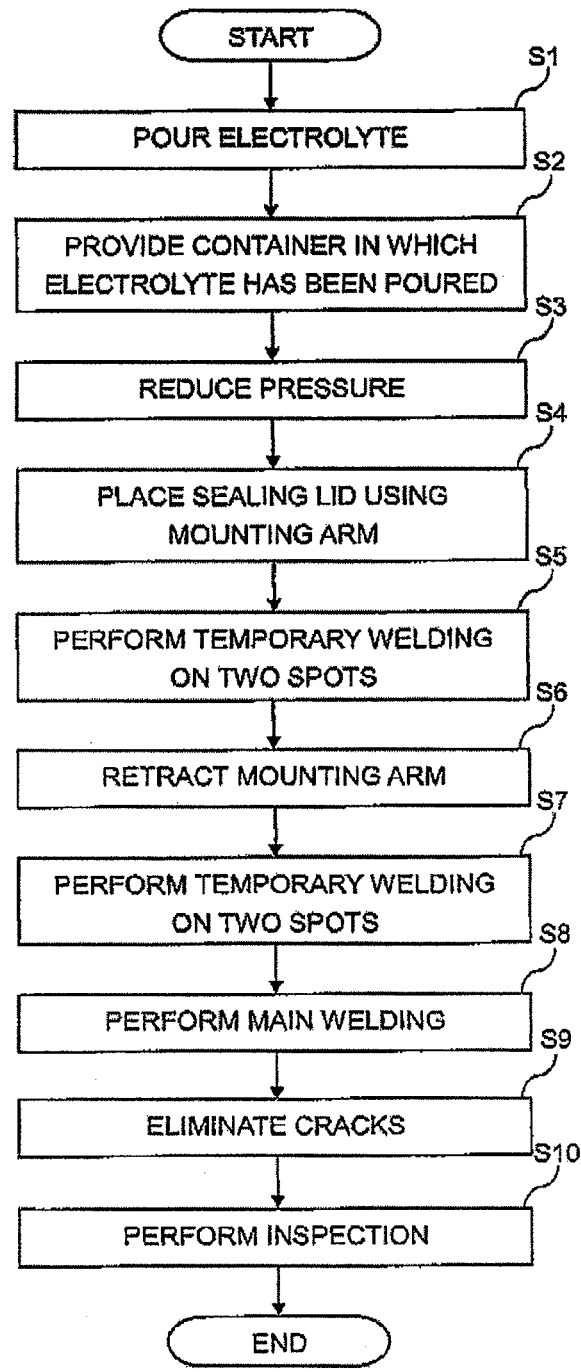
FIG. 4 is a flowchart showing the flow of a manufacturing process to manufacture the secondary battery shown in FIG. 1.

As shown in FIG. 4, first, an electrolyte is poured through the pouring hole 7 into the container 3 using an electrolyte pouring device (Step S1). Subsequently, the container 3 in which the electrolyte has been poured is provided to a laser irradiation device (Step S2).

Next, the ambient atmosphere of the container 3 in which the electrolyte has been poured is put in a reduced pressure state (Step S3). The entire container 3 or only the upper portion thereof where the sealing lid 8 is located is enclosed in an enclosed space, i.e., in a chamber of the laser irradiation device. The atmosphere of the enclosed space within the chamber is reduced in pressure to, for example, 20 kPa in $N_2$ atmosphere.

After the pressure reduction in Step S3, the sealing lid 8 is placed on the lid body 3b of the container 3 in such a manner as to close the pouring hole 7 by a mounting arm such as a robot (Step S4). In the state where the sealing lid 8 is placed, two spots (the upper and lower spots in FIG. 2) on the outer edge of the sealing lid 8 are irradiated with a laser beam using the laser irradiation device, so that the sealing lid 8 is temporarily welded to the lid body 3b (Step S5). Consequently, two circular welding marks 8a, 8b are formed on the outer edge of the sealing lid 8.

Subsequently, the mounting arm is retracted (Step S6). Then two spots (the left and right spots in FIG. 2) on the outer edge of the sealing lid 8 are irradiated with a laser beam using the laser irradiation device, so that the sealing lid 8 is temporarily welded to the lid body 3b (Step S7). Consequently, two circular welding marks 8c, 8d are formed on the outer edge of the sealing lid 8.

The reason why two spots are temporarily welded before retracting the mounting arm in Step S5 is because if the mounting arm is retracted before temporarily welding the two spots, the sealing lid 8 on the lid body 3b may be moved by the retracting operation of the mounting arm, resulting in a displacement of the mounting position from a predetermined position. In order to prevent this problem, two spots are temporarily welded before the mounting arm is retracted as described above. Note that, temporary welding in Step S5 and Step S7 is performed to prevent the sealing lid 8 from being caused to move by the laser irradiation at the time of the main welding.

After the temporary welding in Step S7, the main welding is performed by welding the sealing lid 8 to the lid body 3*b* using the laser irradiation device (Step S8). Furthermore, micro cracks which may occur in the laser welding spots are eliminated (Step S9). Finally, a predetermined inspection such as a shipment test is performed (Step S10).

Figure 5:
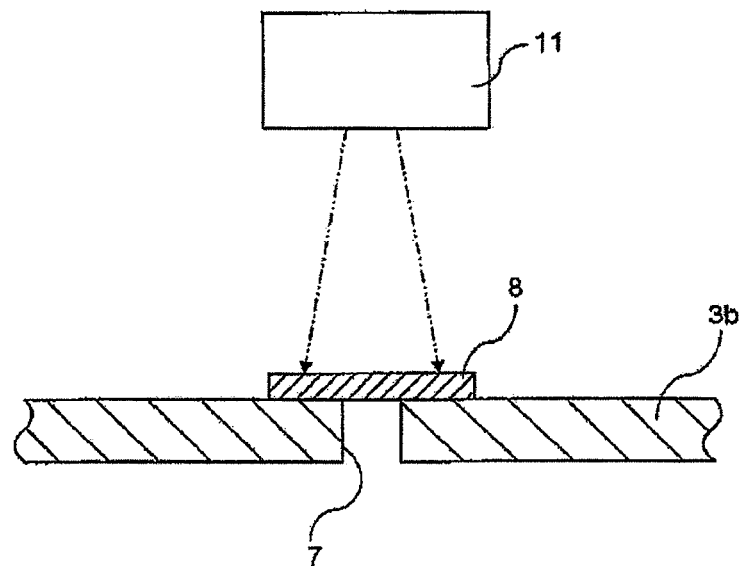
FIG. 5 is an explanatory view for explaining laser welding in the manufacturing process shown in FIG. 4.

In Step S8, as shown in FIG. 5, the laser irradiation device irradiates and scans the surface of the sealing lid 8 in a ring shape with a laser beam having an output capable of melting a metal by using a laser irradiation unit 11. Consequently, the outer edge of the pouring hole 7 is irradiated in a ring shape with a laser beam, and thus the sealing lid 8 is welded to the lid body 3*b*.

As the laser beam scanning method, a scanning method using a scanner such as a galvano scanner is preferable because high-speed laser beam scanning is possible with the method. However, depending on the scanning speed, a method to rotating the work body of the container 3, or a method of moving an optical system using a moving mechanism such as a robot may be used.

Figure 6:
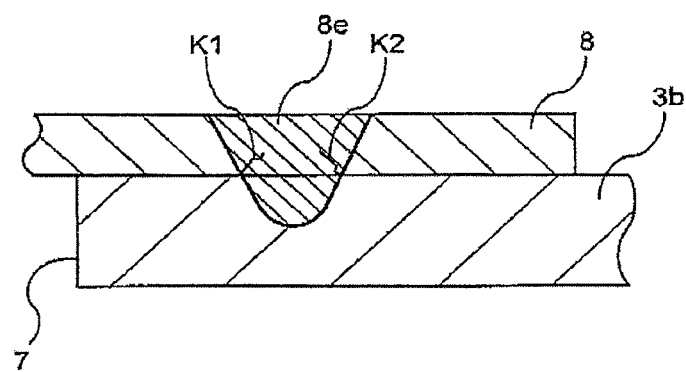
FIG. 6 is a cross-sectional view for explaining a welding mark due to the laser welding in the manufacturing process shown in FIG. 4.

As shown in FIG. 6, in the sealing lid 8, the welding mark 8*e* is formed in a ring shape with a depth through the sealing lid 8 to the container 3 by the above-described laser welding in Step S8. At this stage, micro cracks K1, K2 may occur at the boundary between the lower surface of the sealing lid 8 and the upper surface of the lid body 3*b*. Even when laser irradiation conditions are optimized, or the material for the sealing lid 8 and the material for the lid body 3*b* are optimized, it is extremely difficult to eliminate the micro cracks K1, K2. Thus, the micro cracks K1, K2 are eliminated by the laser irradiation in Step S9.

In Step S9, as shown in FIG. 5, the laser irradiation device scans and irradiates the inner circumferential side of the welding mark 8*e* in a ring shape overlapping with the welding mark 8*e* with a laser beam having an output capable of melting a metal by using the laser irradiation unit 11, and subsequently, scans and irradiates the outer circumferential side of the welding mark 8*e* in a ring shape overlapping with the welding mark 8*e* with a laser beam having an output capable of melting a metal. The output of the laser beam in this process is set to be a value lower than the output at the time of the above-described laser welding in Step S8 so that the welding mark has the same melting depth as the thickness of the sealing lid 8.

Figure 7:
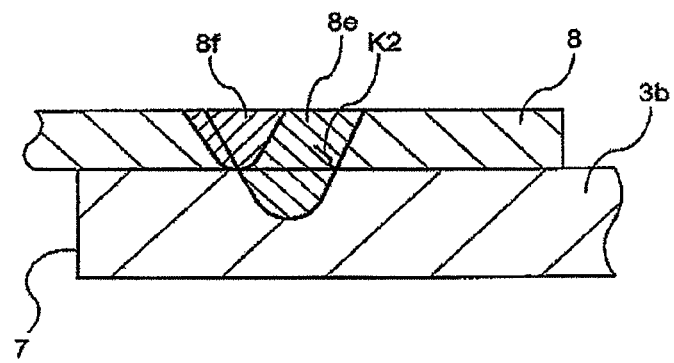
FIG. 7 is a cross-sectional view for explaining a molten mark on an inner circumference due to the laser welding in the manufacturing process shown in FIG. 4.

As shown in FIG. 7, by the above-described laser irradiation of the inner circumferential side of the welding mark 8*e*, the first molten mark 8*f* that overlaps with the inner circumferential side of the welding mark 8*e* is formed in a ring shape in the sealing lid 8 with the same depth as the thickness of the sealing lid 8. In the process of forming the first molten mark 8*f*, i.e., the process in which a portion of the sealing lid 8 is melted by the laser irradiation, and then is solidified, the micro crack K1 is eliminated.

Furthermore, as shown in FIG. 3, by the above-described laser irradiation of the outer circumferential side of the welding mark 8*e*, the second molten mark 8*g* that overlaps with the outer circumferential side of the welding mark 8*e* is formed in a ring shape in the sealing lid 8 with the same depth as the thickness of the sealing lid 8. In the process of forming the second molten mark 8*g*, i.e., the process in which a portion of the sealing lid 8 is melted by the laser irradiation, and then is solidified, the micro crack K2 is eliminated.

Note that, although both of the above-described laser irradiation of the inner circumferential side of the welding mark 8*e* and the above-described laser irradiation of the outer circumferential side thereof are performed in the above, the invention is not limited to this, and at least the inner circumferential side of the welding mark 8*e* may be irradiated with a laser beam. In view of securing the quality for in-vehicle use, eliminating only the micro crack K1 (see FIG. 6) on the pouring hole 7 side (inner side) provides a satisfactory product life. However, in the case of a specific application in which high quality is demanded, it is necessary to eliminate the micro cracks K1 and K2 on both sides.

In this manner, in the manufacturing process of the secondary battery 1, the surface of the sealing lid 8 placed on the pouring hole 7 is irradiated with a focused laser beam in a ring shape so that the sealing lid 8 is welded to the lid body 3*b* of the container 3. Subsequently, an area shifted inward or outward from the trajectory of the previous laser irradiation is irradiated in a ring shape with a laser beam having an output lower than that of the previous laser irradiation for the second time or the third time.

The amount of shift of the trajectory is, for example, controlled to be 1% to 99% of the welding bead width formed by the previous laser irradiation. The laser output for the second time or the third time is controlled so that the melting depth the molten marks 8*f*, 8*g* is the same as the thickness of the sealing lid 8, however, the invention is not limited to this, and the laser outputs may be controlled so that the melting depth may be corresponding to the thickness of the sealing lid 8, for example, in a range of the thickness of the sealing lid 8 ±20% of the thickness (the relationship of $0.8 \times a \leq x \leq 1.2 \times a$ is satisfied where x is the depth, and a is the thickness).

Now, when the secondary battery 1 that is manufactured by the above-described manufacturing process and the secondary battery that is manufactured by the manufacturing process excluding crack elimination process are compared with each other, in the secondary battery, micro cracks having occurred with a probability of nearly 100%. The lengths of the cracks are in a range of 0.02 to 0.11 mm. On the other hand, in the secondary battery 1 that is manufactured by the above-described manufacturing process, no (zero) micro cracks having occurred.

Figure 8:
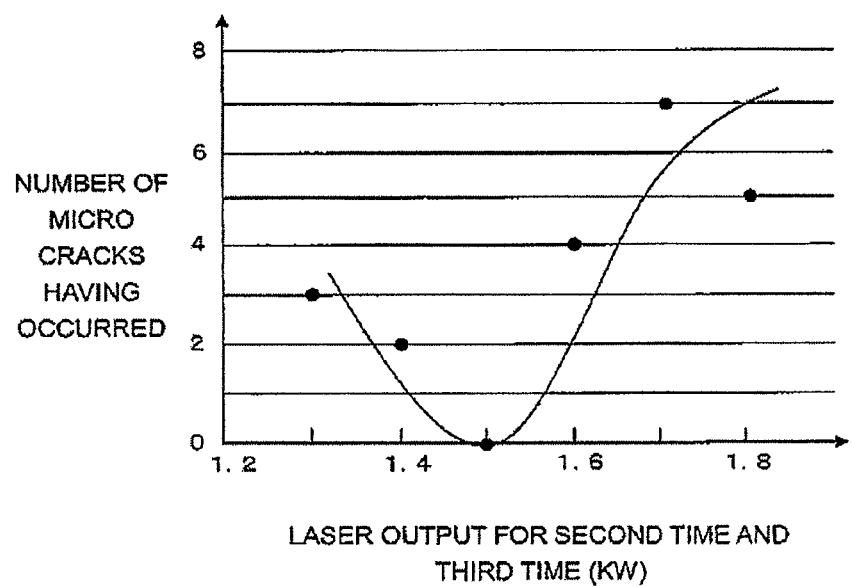
FIG. 8 is a graph for explaining the relationship between laser outputs for the second time or the third time in the manufacturing process shown in FIG. 4, and the frequency of occurrence of a micro crack.

In order to provide such favorable manufacturing conditions, it is essential to adjust the output of the laser beam irradiation for the second time and the third time. For example, when laser output is used as a parameter, as shown in FIG. 8, the output of the laser beam irradiation for the second time and the third time has a significant effect on the occurrence of micro crack. That is to say, occurrence of micro crack varies in accordance with a laser output in FIG. 8, and when the laser output is 1.5 kW, the occurrence is 0 (zero). Consequently, the occurrence of micro cracks can be made 0 (zero) by optimizing the laser output for the second time and the third time irradiation.

Note that, in the above-described welding of the sealing lid 9, the entire container 3 or only the upper portion thereof is made an enclosed space and the atmosphere in the enclosed space is reduced in pressure when the sealing lid 9 is welded. However, in the case where the relevant exhaust velocity is high or the ultimate vacuum is high, a large quantity of electrolyte will leak out from the pouring hole 7, and thus it is essential to control reduced atmosphere in a range of 10 kPa to 30 kPa. For example, the exhaust system is controlled with a pressure of 20 kPa as a targeted value.

Subsequently, the sealing lid 9 is irradiated with a laser beam in a reduced-pressure atmosphere and is welded as described above.

Figure 9:
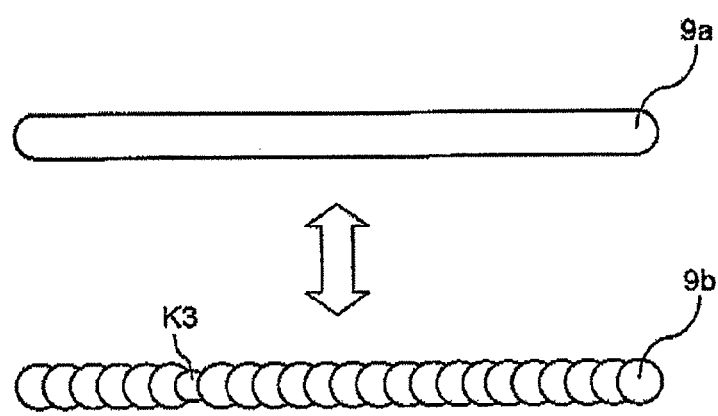
FIG. 9 is an explanatory view for explaining a welding mark due to CW laser beam irradiation, and a welding mark due to pulse laser beam irradiation.

Here, the case where a continuous wave laser (CW laser) is used as the aforementioned laser beam, and the case where a pulse laser beam is used as the aforementioned laser beam are described with reference to FIG. 9. In FIG. 9, a welding mark 9a formed by CW laser beam irradiation is shown on the upper side, and a welding mark 9b formed by pulse laser beam irradiation is shown on the lower side. Note that the CW laser beam is a temporally continuous laser beam, and the aforementioned pulse laser beam is a temporally discontinuous laser beam.

As shown in FIG. 9, the welding mark 9a formed by CW laser beam irradiation is a single continuous line, but the welding mark 9b formed by pulse laser beam irradiation includes a weld defect K3. In the welding by a pulse laser, because the pulse energy is temporally discontinuous, the melting time is short, and when a laser pulse with weak laser energy is radiated even once, the welding mark (welding beads) 9b is significantly affected by the laser pulse. Consequently, the weld defect K3 tends to occur.

On the other hand, in the welding by a Cw laser, the melting time of metal is relatively long, and a metal molten pool continuously moves, and thus the welding mark 9a as a processing mark is not significantly affected even the power varies somewhat. In addition, even when the absorption rate of the laser beam varies in accordance with the surface conditions of the metal as a welding target, the welding mark 9a is not affected much for the same reason as described above. Therefore, even with a disturbance factor, when a CW laser is used for welding, irregularity in the welding mark 9a is little, and thus extremely stable welded joint may be obtained.

In addition, because the pulse laser has a relatively high peak power and thus is widely used for welding process, however, in the welding by a pulse laser, the melting time of metal as a processing object is short, the molten mark becomes discontinuous (what is called a patchwork mark). Therefore, a weld defect such as a splash or a blow hole tends to occur, and the reliability as a joint is significantly low. Consequently, in many cases, a welded joint by a pulse laser cannot be used for vehicle mount application, which requires high welding quality.

In addition, laser welding by a pulse laser has another problem, that is, low productivity. Specifically, the welding speed can be improved up to only several tens mm/s at the maximum, and the throughput is low, and thus it is difficult to improve productivity. On the other hand, by using a CW laser beam for welding, specifically using a solid state laser such as a fiber laser or a disk laser, which is capable of oscillating with continuous output power in the order of several kW, reliability and productivity of the welding can be improved.

As described above, according to the present embodiment, the sealing lid 8 is placed on the container 3 in such a manner as to close the pouring hole 7 of the container 3 in which an electrolyte has been poured, and the placed sealing lid 8 is irradiated with a laser beam in a ring shape in such a manner as to form a welding mark 8e in the sealing lid 8, with a depth through the sealing lid 8 to the container 3, thereby welding the sealing lid 8 to the container 3, then the welded sealing lid 8 is irradiated with a laser beam in a ring shape in such a manner as to form a first molten mark 8f in a ring shape overlapping with the welding mark 8e, on the inner circumferential side of the welding mark 8e in the sealing lid 8, with a depth corresponding to the thickness of the sealing lid 8. Thus, the micro crack K1 (see FIG. 6) on the inner circumferential side of the welding mark 8e, i.e., the pouring hole 7 side can be eliminated. Consequently, defective occurrence of the micro crack K1 due to laser welding is reduced, and thus high quality and high reliability of the secondary battery 1 may be achieved. In addition, the secondary battery 1 can be manufactured with a high yield.

In addition, by irradiating the welded sealing lid 8 with a laser beam in a ring shape in such a manner as to form a second molten mark 8g in a ring shape overlapping with the welding mark 8e, on the outer circumferential side of the welding mark 8e in the sealing lid 8, with a depth corresponding to a thickness of the sealing lid 8, the micro crack K2 (see FIG. 6) on the outer circumferential side of the welding mark 8e, i.e., on the opposite side to the pouring hole 7 can be eliminated. Consequently, defective occurrence of the micro crack K2 due to laser welding is securely reduced, and thus high quality and high reliability of the secondary battery 1 may be achieved.

In addition, by irradiating with a laser beam in such a manner as to form the first molten mark 8f or the second molten mark 8g having a depth in a range of the thickness of the sealing lid 8 ±20% of the thickness, the micro cracks K1, K2 which may occur at the boundary between the sealing lid 8 and the lid body 3b can be securely eliminated. Consequently, defective occurrence of the micro cracks K1, K2 due to the laser welding is securely reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
    a container, having a pouring hole through which an electrolyte is poured, for housing the electrolyte poured through the pouring hole, and an electrode body, and
    a sealing lid for closing the pouring hole,
    wherein the sealing lid is fixed to the container by a ring-shaped welding portion having a depth formed in the container and the sealing lid using a first laser welding, the sealing lid having a first ring-shaped molten portion that partially overlaps with a first side of the ring-shaped welding portion, the first ring-shaped molten portion having a depth that is less than the depth of the welding portion and in a range of ±20% of a thickness of the sealing lid and formed using a second laser welding so as to reduce micro cracks formed on the first side of the ring-shaped welding portion created during formation of the ring-shaped welding portion.
2. The secondary battery according to claim 1,
    wherein the sealing lid has a second ring-shaped molten portion that partially overlaps with a second side of the ring-shaped welding portion, the second ring-shaped molten portion having a depth that is less than the depth of the welding portion and in a range of ±20% of the thickness of the sealing lid and formed using a third laser welding so as to reduce micro cracks formed on the second side of the ring-shaped welding portion created during formation of the ring-shaped welding portion.

3. The secondary battery according to claim 2, wherein power output of a laser beam used for the third laser welding is lower than power output of a laser beam used in the first laser welding.

4. The secondary battery according to claim 1, wherein the ring-shaped welding portion is formed in a single continuous line.

5. The secondary battery according to claim 1, wherein power output of a laser beam used for the second laser welding is lower than power output of a laser beam used in the first laser welding.

* * * * *